(12) United States Patent
Mahasenan et al.

(10) Patent No.: US 10,182,309 B2
(45) Date of Patent: Jan. 15, 2019

(54) MAGNETIC FINGERPRINTING FOR PROXIMITY-BASED SYSTEMS

(71) Applicant: Honeywell International Inc., Morristown, NJ (US)

(72) Inventors: Arun Vijayakumari Mahasenan, Hopkins, MN (US); Amit Kulkarni, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/085,052

(22) Filed: Mar. 30, 2016

(65) Prior Publication Data
US 2017/0289753 A1  Oct. 5, 2017

(51) Int. Cl.
| H04W 4/06 | (2009.01) |
| H05B 33/08 | (2006.01) |
| H05B 37/02 | (2006.01) |
| G01C 21/00 | (2006.01) |
| G07C 9/00 | (2006.01) |
| H04W 4/02 | (2018.01) |
| G06Q 10/10 | (2012.01) |
| H04W 4/00 | (2018.01) |
| H04L 9/32 | (2006.01) |
| H04W 4/021 | (2018.01) |
| H04W 4/80 | (2018.01) |
| G01C 21/08 | (2006.01) |

(52) U.S. Cl.
CPC .......... *H04W 4/021* (2013.01); *G01C 21/08* (2013.01); *G07C 9/00119* (2013.01); *H04W 4/023* (2013.01); *H04W 4/80* (2018.02); *G07C 2009/0096* (2013.01); *G07C 2009/00555* (2013.01); *G07C 2009/00769* (2013.01); *G07C 2209/63* (2013.01)

(58) Field of Classification Search
CPC ........... G07C 9/00; H04W 4/02; G06Q 10/10; H04L 9/32; H04L 12/22
USPC .......... 340/5.2, 5.27, 5.3, 5.7; 315/149, 292; 701/200, 215, 220, 23
See application file for complete search history.

(56) References Cited

U.S. PATENT DOCUMENTS 7,242,306 B2 *  7/2007  Wildman .............. A61B 5/1113
340/573.1
7,845,201 B2 * 12/2010  Meyerle .............. E05B 47/0011
70/223

(Continued)

OTHER PUBLICATIONS

Examination Report from related GB application 1704989.1 dated Sep. 23, 2017 (9 pages).

*Primary Examiner* — Nam V Nguyen
(74) *Attorney, Agent, or Firm* — Honeywell International Inc.

(57) ABSTRACT

Systems, devices, and methods for magnetic fingerprinting for proximity-based systems are described herein. One device includes instructions stored thereon executable by a processor to receive location information associated with a mobile device in a facility, determine that the mobile device is within a particular distance of an area of the facility based on the location information, determine magnetic field information associated with the mobile device, and allow access to the area via a relay associated with the area responsive to a determination that the user is allowed access based on the magnetic field information.

15 Claims, 2 Drawing Sheets

(56) References Cited

U.S. PATENT DOCUMENTS

| | | | | |
|---|---|---|---|---|
| 8,046,160 B2* | 10/2011 | Carter | A47F 10/04 | |
| | | | 701/498 | |
| 8,430,310 B1* | 4/2013 | Ho | G06F 21/35 | |
| | | | 235/382 | |
| 8,686,851 B2* | 4/2014 | Davis | G01C 21/206 | |
| | | | 340/539.12 | |
| 8,730,312 B2* | 5/2014 | Roebke | G06F 17/30041 | |
| | | | 345/633 | |
| 8,752,200 B2* | 6/2014 | Varshavsky | H04L 9/3231 | |
| | | | 713/168 | |
| 8,934,921 B2* | 1/2015 | Marti | G01C 21/10 | |
| | | | 455/456.2 | |
| 9,026,144 B2* | 5/2015 | Wuoti | G06Q 30/0207 | |
| | | | 455/456.3 | |
| 9,462,423 B1* | 10/2016 | Rivlin | H04W 4/02 | |
| 9,483,887 B1* | 11/2016 | Soleimani | G07C 9/00007 | |
| 9,497,819 B2* | 11/2016 | Van De Sluis | H05B 37/0227 | |
| 9,602,963 B2* | 3/2017 | Chaudhri | H04W 4/02 | |
| 2009/0324025 A1 | 12/2009 | Camp, Jr. | | |
| 2014/0273826 A1 | 9/2014 | Want et al. | | |
| 2014/0292481 A1* | 10/2014 | Dumas | G07C 9/00111 | |
| | | | 340/5.61 | |
| 2014/0320121 A1 | 10/2014 | Perttunen et al. | | |
| 2015/0111552 A1* | 4/2015 | Kaye | H04M 3/56 | |
| | | | 455/416 | |
| 2015/0215443 A1* | 7/2015 | Heo | H04M 1/0202 | |
| | | | 455/556.1 | |
| 2015/0370346 A1* | 12/2015 | Smus | G01R 33/093 | |
| | | | 345/156 | |
| 2016/0307380 A1* | 10/2016 | Ho | G07C 9/00079 | |
| 2016/0335819 A1 | 11/2016 | Lingan et al. | | |
| 2016/0358391 A1* | 12/2016 | Drako | G07C 9/00103 | |

* cited by examiner

MAGNETIC FINGERPRINTING FOR PROXIMITY-BASED SYSTEMS

TECHNICAL FIELD

The present disclosure relates to systems, devices, and methods for magnetic fingerprinting for proximity-based systems.

BACKGROUND

Various devices and/or systems may operate in part based on a user's proximity to those devices and/or systems. For example, access control systems are designed to provide access to areas of a building for individuals who are authorized to access such areas, and deny access to those areas of the building to individuals who are not authorized to access such areas.

Previous approaches may use wireless beacons (e.g., iBeacon, Eddy Stone, etc.) for proximity-based applications. As an authorized user's mobile device enters a region (e.g., "geofence") created by one or more beacons, access to a desired area may be granted, in some instances.

However, beacons can be spoofed and/or replicated by a nefarious entity (attacker), causing the proximity-based application to be compromised. For example, in an access control system using a beacon to trigger a door to open, an attacker can create a replica of the beacon and use it to trigger the door to open even when the user (i.e., the mobile device of the user) is located elsewhere outside the geofence.

DETAILED DESCRIPTION

Magnetic fingerprinting for proximity-based systems is described herein. For example, one or more embodiments include a computer-readable medium having instructions stored thereon executable by a processor to receive location information associated with a mobile device in a facility, determine that the mobile device is within a particular distance of an area of the facility based on the location information, determine magnetic field information associated with the mobile device, and allow access to the area via a relay associated with the area responsive to a determination that the user is allowed access based on the magnetic field information.

Embodiments of the present disclosure can provide enhanced security to proximity-based systems. Proximity-based systems, as referred to herein, are systems whose operations may be governed in part by the location of a user (determined based on a location of a mobile device associated with the user). Some proximity-based systems may utilize a "geofence," which may be a boundary that when crossed, activates (or deactivates) one or more aspects of the proximity-based system.

In some instances, proximity-based systems can be utilized to automate various aspects of user interaction with systems and/or devices. For example, a door can open for an authorized user when he approaches it, a thermostat can activate when a user leaves work such that the user's home reaches a desired temperature when the user arrives, lights in a room can turn on or off depending on a user's presence in the room.

For purposes of illustration, the present disclosure makes reference to the example of access control systems. However, it is to be understood that embodiments of the present disclosure are not limited to access control systems. Other proximity-based systems can utilize user location with respect to a particular area. By way of example and not limitation, proximity-based systems can include heating, ventilation, and air conditioning (HVAC) systems, fire and safety systems, security systems, and/or video surveillance systems, among others. Proximity-based systems may be used in commercial and residential settings.

Embodiments of the present disclosure can provide increased security while maintaining streamlined user interaction with proximity-based systems. For example, embodiments of the present disclosure can be implemented in existing systems and can reduce the likelihood of unwanted interaction with devices and/or systems.

In some embodiments, global positioning system (GPS), WiFi, Bluetooth, and/or other location functionalities provided by the mobile device may allow the automatic determination of user location and/or proximity. In some embodiments, the determination of user proximity may be responsive to user input. In some embodiments, the determination of user proximity may be done without user input. Thus, rather than physically presenting a card (or other device) for access to an area, the user can simply draw within a particular distance of the area.

Embodiments of the present disclosure can determine a magnetic fingerprint associated with a particular location. Thus, when a user draws within a particular distance of the area, magnetic field information can be determined by the mobile device and compared to the known magnetic fingerprint. If the field information matches the fingerprint (within a particular threshold amount), the user can be granted access. A threshold may be selected based upon known variance of magnetic field(s) within the structure. A threshold may be selected based upon known variance of magnetic field(s) within a particular subset of the structure. Accordingly, embodiments herein can provide added security by preventing the attacker from simply spoofing or replicating a wireless beacon to gain access.

In some embodiments, two phases may exist: one to collect data at time of installation (e.g., commissioning, configuration, etc.), and another where data is correlated to verify location (proximity). For example, in the first phase, an "area" or "geofence" (described further below) can be designed and/or defined, one or more beacons may be installed and correlated with the area, RF and magnetic fingerprints may be determined in the area to map a relationship between the physical space of the area and the signal space. Those fingerprints may be stored in memory, for instance. In the second phase, a device carried by a user who enters the area can communicate with the one or more beacons, which may trigger the device carried by the user to determine magnetic field data and compare that data with the known fingerprint. Once the RF and magnetic field data match, one or more proximity-based system devices may change state (e.g., allow access, turn on/off, adjust, etc.).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of areas" can refer to one or more areas.

Figure 1:
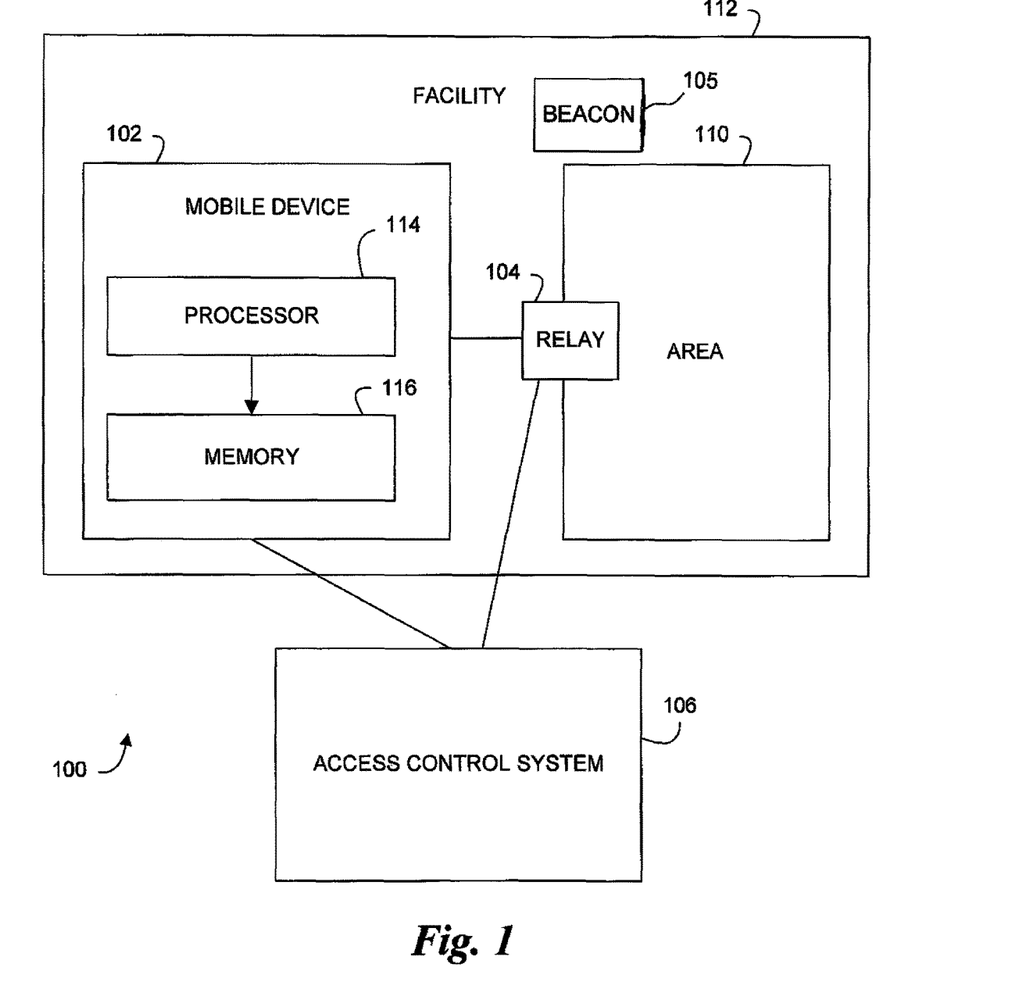
FIG. 1 illustrates a system for magnetic fingerprinting for proximity-based systems in accordance with one or more embodiments of the present disclosure.

FIG. 1 illustrates a system 100 for magnetic fingerprinting for proximity-based systems in accordance with one or more embodiments of the present disclosure. As shown in FIG. 1, system 100 includes a mobile device 102, a relay 104, and an access control system (ACS) 106. One or more portions of the system 100 can be implemented in a facility 112, for instance. A facility, as used herein, can refer to one or more buildings, businesses, homes, plants, hospitals, refineries, etc. Facilities can include indoor and/or outdoor areas. Though in the example illustrated in FIG. 1 the ACS 106 is shown external to the facility 112 (e.g., remote with respect to the facility 112), embodiments of the present disclosure are not so limited. In some embodiments, the ACS 106 is internal to the facility 112 (e.g., local with respect to the facility 112).

The mobile device 102 can be a client device carried or worn by a user. For example, the mobile device 102 can be a phone (e.g., smartphone), personal digital assistant (PDA), tablet, and/or wearable device (e.g., wristband, watch, necklace, etc.). The mobile device 102 can include one or more software applications (e.g., apps) which can define and/or control communications between the mobile device 102, the ACS 106, and/or other devices. Apps may be received by the mobile device 102 from the ACS 106, for instance. Apps may be launched by a user and/or responsive to some other condition (e.g., the interaction between the mobile device 102 and a beacon (discussed below)). In some embodiments, apps can be executing as background apps. Apps may be and/or include a digital identity, discussed further below.

The relay 104 can be a device allowing remote control that can be actuated by variation in conditions of one or more electric circuits. In some examples, the relay 104 can be a locking device (e.g., for a door). In some examples, the relay 104 can include one or more actuating mechanisms. The relay 104 can be associated with one or more controlled functionalities. As used herein "controlled functionality" refers to a functionality under the control of the ACS 106 (or another control system). For example, controlled functionalities can include one or more HVAC devices (e.g., thermostats), cameras, lights, sound systems, displays (e.g., televisions), etc. For instance, an electronic door lock may be controlled by the ACS 106.

In some embodiments, the control may be provided from the mobile device 102. In some embodiments, the control may be provided directly (from the ACS 106 to the relay 104) or via one or more intermediary devices (e.g., a controller) in communication with the relay 104.

Because, as described above, the "card" can be presented to a "reader" by virtue of the mobile device 102 being in a particular physical location (or within a particular distance of a particular physical location), embodiments of the present disclosure can implement the relay 104 in the absence of a controller (e.g., a local controller). That is, in some embodiments, the relay 104 does not include a controller. In some embodiments, control logic can be part of the relay (e.g., actuator). In some embodiments, the controller can reside in a local (at the facility) network (e.g., Wiegand, Ethernet, RS485, etc). Various examples herein may refer to the relay 104 being a locking device for a door, but it is to be understood that such examples are not to be taken in a limiting sense; embodiments of the present disclosure do not limit relay 104 to a particular device.

The relay 104 can be associated with an area 110 of the facility 112. As referred to herein, an area can be a portion of a facility. In some embodiments, the area 110 can be a room, a geofence, a plurality of rooms, a wing, a building, a plurality of buildings, an installation, etc. In some embodiments, the area 110 can be defined by physical boundaries (e.g., walls, doors, etc.). In some embodiments, the area 110 can be defined by logical and/or geographic boundaries. The area 110 can be defined by a user, by a Building Information Model (BIM) associated with the facility 112, and/or by the ACS 106.

The ACS 106 can control (e.g., manage) access to a number of areas (e.g., the area 110) of the facility 112. As previously discussed, the ACS 106 can be remote with respect to the facility 112 and/or local with respect to the facility 112. In some embodiments, the ACS 106 can be cloud-based. In some embodiments, the ACS 106 can manage access to one or more areas across a plurality of facilities.

The mobile device 102 can communicate with (e.g., exchange data with) the ACS 106 via a wired and/or wireless connection, for instance. In some embodiments, the mobile device 102 can communicate using one or more communications modules (e.g., cellular, WiFi, etc.). The ACS 106 can communicate with the relay 104 via a wired and/or wireless connection, for instance. Communication between various devices herein can be carried out over a wireless network. A wireless network, as used herein, can include WiFi, Bluetooth, or any other suitable means to wirelessly transmit and/or receive information.

The mobile device 102 can include a location functionality configured to determine a location of the mobile device. In some embodiments, the location functionality includes a GPS and/or WiFi functionality of the mobile device, though embodiments of the present disclosure are not so limited. For example, the mobile device can include an imaging functionality (e.g., a camera) which can be used to read a code at a particular (e.g., known) location in the facility 112.

In some embodiments, the system 100 can include a beacon 105. The beacon 105 can be a device capable of wireless communication with the mobile device 102. In some embodiments, the beacon 105 can be associated with (e.g., located proximal to) the relay 104 and/or the area 110. In addition to, or in place of, the location functionality of the mobile device 102, the beacon 105 can allow the determination of a location of the mobile device 102. For example, the beacon 105 can allow the determination of whether the mobile device 102 is within a particular (e.g., threshold) distance of the area 110, the relay 104, and/or the beacon 105. The beacon 105 can allow the determination of whether the mobile device 102 is within a geofence associated with the area 110, the relay 104, and/or the beacon 105. The beacon 105 can communicate with the mobile device 102 via Bluetooth Low Energy (BLE) technology (e.g., as an iBeacon), WiFi, etc. In some embodiments, the beacon 105 can include one or more readable tags (e.g., near field communication (NFC)) tags. Though one beacon 105 is shown, embodiments of the present disclosure are not limited to a particular number of beacons.

The mobile device 102 can include a magnetic field functionality (e.g., magnetic field measurement functionality). In some embodiments, for example, the mobile device 102 can include a magnetic sensor. In some embodiments, the magnetic sensor can be activated responsive to the establishment of a wireless communication with the beacon 105. In some embodiments, the magnetic sensor can be activated responsive to a user input, such as an input made using a touch screen display of the mobile device and/or a gesture made using the mobile device. The magnetic sensor can determine a magnetic field associated with (e.g., immediately around) the mobile device 102. The magnetic field can include a level (e.g., value and/or intensity) of the field. In some embodiments, the level of the magnetic field may be represented by Tesla units. The magnetic field can include a direction (e.g., an orientation) of the field. In some embodiments, the direction of the magnetic field may be represented by a compass heading (e.g., in degrees).

The mobile device 102 can include a memory 116 and a processor 114 configured to execute executable instructions stored in the memory 116 to perform various examples of the present disclosure, for example. That is, the memory 116 can be any type of non-transitory storage medium that can be accessed by the processor 114 to perform various examples of the present disclosure. For example, the memory 116 can be a non-transitory computer readable medium having computer readable instructions (e.g., computer program instructions) stored thereon that are executable by the processor 114.

The memory 116 can be volatile or nonvolatile memory. The memory 116 can also be removable (e.g., portable) memory, or non-removable (e.g., internal) memory. For example, the memory 116 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 116 is illustrated as being located within the mobile device 102, embodiments of the present disclosure are not so limited. For example, memory 116 can also be located internal to another computing resource (e.g., enabling computer readable instructions to be downloaded over the Internet or another wired or wireless connection). In some embodiments, the memory 116 and/or the processor 114 can be located in the ACS 106.

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Figure 2:
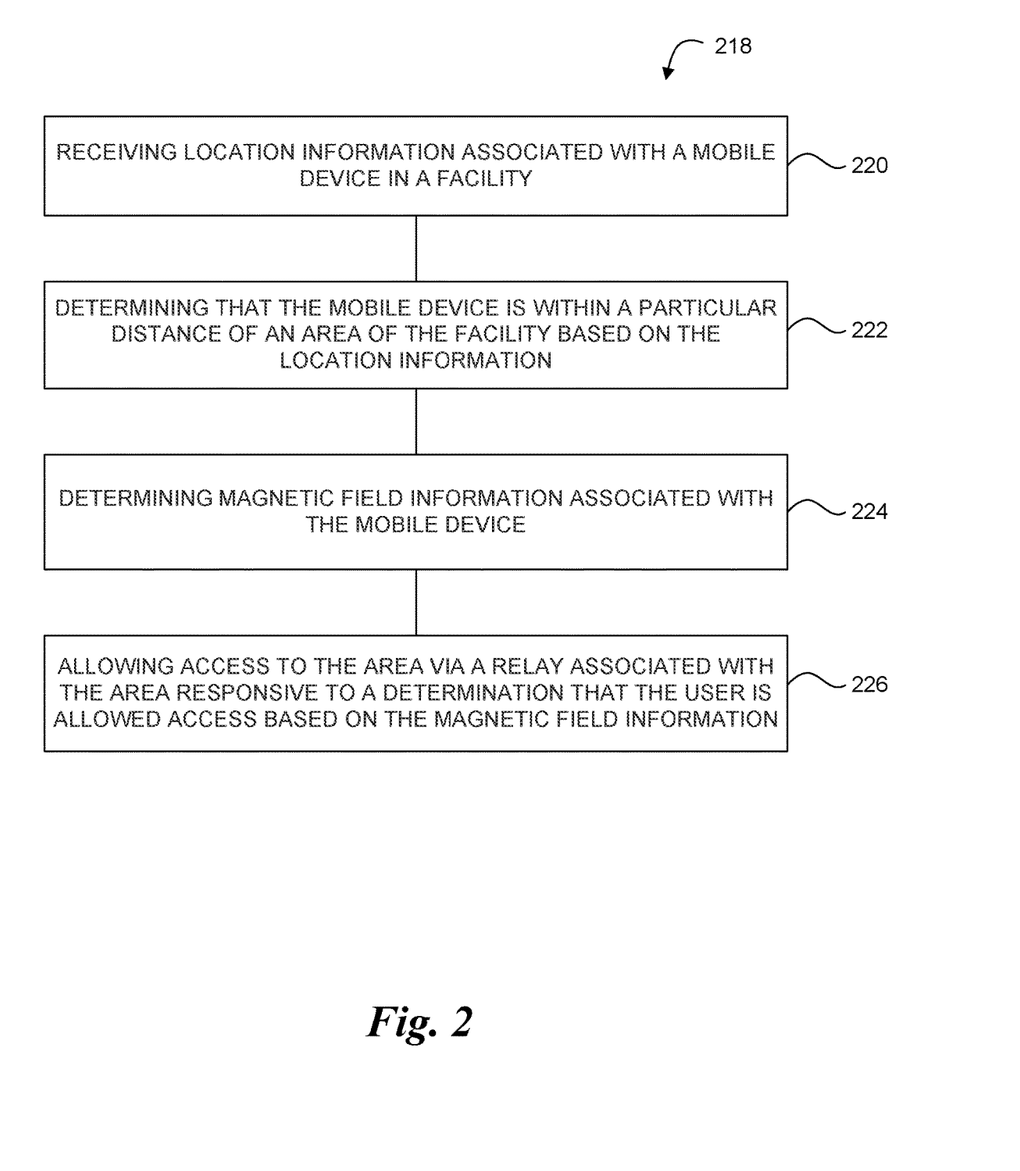
FIG. 2 illustrates a method for magnetic fingerprinting for proximity-based systems in accordance with one or more embodiments of the present disclosure.

FIG. 2 illustrates a method 218 for magnetic fingerprinting for proximity-based systems in accordance with one or more embodiments of the present disclosure. In some embodiments, method 218 can be performed by the mobile device 102 (previously discussed in connection with FIG. 1). In some embodiments, method 218 can be performed by ACS 106 (previously discussed in connection with FIG. 1), though embodiments of the present disclosure are not so limited.

At block 220, method 218 includes receiving location information associated with a mobile device in a facility. Location information can include a location of the mobile device. The location can be provided as a particular geographic location (e.g., latitude/longitude) and/or a location with respect to another location, such as an area of a facility or a beacon of a facility. In some embodiments, location information can be communicated from the mobile device, and thus received, responsive to a communication being established between the mobile device and one or more beacons of a facility. In some embodiments, an indication that the mobile device is within a particular distance of an area of a facility can be received (e.g., as a request for access to the area).

At block 222, method 218 includes determining that the mobile device is within a particular distance of (e.g., in proximity to) an area of the facility based on the location information. In some embodiments, location information can include a determination that the mobile device is located within a particular area and/or within a particular distance of an area of a facility. For example, embodiments of the present disclosure can determine that the user has drawn within 5 meters of a secure area of a facility. Being within the particular distance of the area may indicate that the user desires to enter the area. Further, embodiments of the present disclosure can determine a direction of travel of the user and/or a speed of the user. If the user is traveling directly toward the area, embodiments can determine that the user desires to enter the area.

At block 224, method 218 includes determining magnetic field information associated with the mobile device. As previously discussed, the mobile device can include a magnetic sensor. The magnetic sensor can determine a level and/or a direction of a magnetic field where the mobile device is located. Because, for instance, each location may have a unique or characteristic magnetic "fingerprint," the determination of the magnetic field can allow the verification that the mobile device is actually in a same location determined using the location information above (e.g., within a particular distance of (or in proximity to) an area of the facility based on the location information).

In some embodiments, the magnetic fingerprint can be determined by the mobile device during a calibration and/or commissioning. For example, when a communication is established between the mobile device and a beacon, the mobile device can take a reading of the magnetic field at that location. The magnetic field at the location where the communication is established can be the magnetic fingerprint of that location. In some embodiments, the magnetic fingerprint can be determined responsive to a user input. For instance, the user can position the mobile device at a desired location and enter one or more inputs into the mobile device such that the magnetic fingerprint at that location is determined.

A baseline fingerprint can be determined during a commissioning of a relay, for instance. In some embodiments, a user can walk around the area and collect fingerprint data (RF and/or magnetic) to determine the baseline fingerprint. In some embodiments, the user can define the area and/or the geofence.

In some embodiments, a magnetic fingerprint may be valid for an entire range of a beacon. In some embodiments, there may be a plurality of magnetic fingerprints within the range of a beacon. Embodiments of the present disclosure may take facility context into account. In some embodiments, if the mobile device is in communication with more than one beacon, a more precise location of the mobile device may be determined and a similarly more precise magnetic fingerprint may be associated with that location.

Once determined, the magnetic fingerprint can be stored in memory. In some embodiments the magnetic fingerprint can be stored in a memory of the mobile device. In some embodiments, the magnetic fingerprint can be stored in a memory of another computing device. A plurality of magnetic fingerprints can be stored. Each magnetic fingerprint can be associated (e.g., via a table) with a respective, different location. As previously discussed, locations can be determined using one or more beacons and/or by other methods, such as GPS, for instance.

After the magnetic fingerprint is determined and stored in memory, embodiments of the present disclosure can determine that the mobile device has reached a location where the magnetic fingerprint was determined (e.g., using one or more beacons). Responsive to the establishment of communication with the one or more beacons (and, in some embodiments, in response to one or more user inputs), the mobile device can determine magnetic field information.

The determination of magnetic field information can allow embodiments herein to determine if the user is indeed at the location or if the location has somehow been spoofed, for instance. Embodiments of the present disclosure can compare the determined magnetic field information with the magnetic fingerprint associated with the location. As discussed, in some embodiments, such comparison can be done responsive to one or more user inputs. In some embodiments, such comparison can be done automatically (e.g., without user input).

Depending on the comparison, embodiments of the present disclosure can allow access or deny access. For example, if the determined magnetic field information "matches" the magnetic fingerprint (and/or the RF fingerprint), embodiments of the present disclosure can determine that a valid user is actually present at the location attempting to gain access and can allow the user access. If the determined magnetic field information does not "match" the magnetic fingerprint, embodiments of the present disclosure can determine that an attacker may be attempting to illicitly gain access and deny the user. Other actions can be taken; for instance, embodiments of the present disclosure can provide a notification to security personnel that the locations do not match.

One or more thresholds can be set regarding how different the determined magnetic field information and the magnetic fingerprint may be in order to deny a user. Exceeding a threshold comparison can yield access, whereas not exceeding a threshold comparison can yield denial of access. Thresholds can include thresholds for magnetic field level(s) and/or for direction(s). For example, if the comparison results in the magnetic field information being within 1 millitesla of the magnetic fingerprint, access may be granted, whereas if a difference between the magnetic field and the magnetic fingerprint exceeds 1 millitesla, access may be denied. In some embodiments, if the direction of the determined magnetic field differs from the direction of the magnetic fingerprint by more than 0.1 degrees, access may be denied. It is to be understood that these values are used for illustration; embodiments herein are not limited to a particular threshold difference.

As previously discussed, comparison of determined magnetic field information and magnetic fingerprints can be done responsive to one or more user inputs. In some embodiments, the user input is a gesture made using the mobile device. A gesture, as referred to herein, includes a particular movement, positioning, orientation, and/or manipulation of the mobile device. For example, in some embodiments, the gesture can include a knock by the user on the mobile device. In some embodiments, the gesture can include a plurality of knocks by the user on the mobile device. A "knock" can refer to a striking, by an object, of the mobile device. A knock on the mobile device can resemble a knock on a door, for instance.

In some embodiments, the gesture can include a manipulation of an orientation of the mobile device. For example, the mobile device can be shaken, rotated, and/or twisted, among other manipulations. In some embodiments, the gesture can include a presentation of the mobile device to an object associated with the area. That is, the mobile device can be presented (e.g., drawn near) a door, door reader, turnstile, door frame, etc. The mobile device can be knocked against a card reader, for instance.

In some embodiments, the gesture can include a particular manipulation of the mobile device, wherein the particular manipulation does not include the mobile device impacting an object. For example, the mobile device can be used to "knock" without making contact with another object (other than the user).

In some embodiments, the mobile device can be configured to prompt the user to make the gesture. For example, upon determining that the mobile device is within the particular distance of the area of the facility, embodiments of the present disclosure can prompt the user to make the gesture. The prompt can be a particular sound played by the mobile device and/or a particular vibration, among other prompts. In some embodiments, performance of the gesture before the prompt to make the gesture may be ineffective at obtaining access.

Though not illustrated in FIG. 2, method 218 can include determining whether a user of the mobile device (e.g., when the mobile device is in proximity to the area) is allowed access to the area. In some embodiments, the determination of whether the user of the mobile device is allowed access to the area can be made by the mobile device. In some embodiments, the determination of whether the user is allowed access to the area can be made by a (local and/or remote) access control system.

As discussed herein, the determination of whether the user of the mobile device is allowed access to the area can be made by the mobile device. Accordingly, access control (i.e., the determination of whether to grant access) can be moved from a controller (or other hardware device(s) seen in previous approaches) to the mobile device itself. Accordingly, where access control is implemented on a mobile device in accordance with embodiments of the present disclosure, facilities need not employ complex physical access controllers capable of managing access only to a limited number of access points (e.g., doors) as in previous approaches. Instead, a remote and/or virtual (e.g., cloud-based) controller can be implemented, for instance, in conjunction with one or more relays (such as those previously discussed).

Determining whether the user is allowed access to the area can include determining whether the user (via the mobile device) has been provided with (or otherwise received) a digital identity. A digital identity can correspond to the physical identity of the user. The digital identity can be unique to the mobile device of the user (e.g., one digital identity per mobile device of the user). The digital identity can be (or be a portion of) an app, for instance (e.g., executable instructions stored on a computer-readable medium).

In some embodiments, the digital identity can be a permanent digital identity. A permanent digital identity can be a digital identity that does not expire. For example, a permanent digital identity can be sent to the mobile device of a user who is an employee that works in the facility. The employee can utilize the permanent digital identity until the employee is no longer employed at the facility.

In some embodiments, the digital identity can be a temporary digital identity. A temporary digital identity can be a digital identity that expires after a set period of time. For example, a temporary digital identity can be sent to the mobile device of a user who is a visitor or guest at the facility. After the set period of time, the visitor/guest's temporary digital identity can expire, and the visitor/guest can lose access to the building (or to particular areas of the building). In some embodiments, the digital identity can be shared with a building management system. The building management system can allow management (e.g., monitoring and/or control) of the facility.

Thus, determining whether the user of the mobile device is allowed access to the area can include determining whether the user is allowed access at the particular time that the user is in proximity to the area. The time can refer to the time of a day and/or the day of a week, for instance, though embodiments of the present disclosure are not so limited.

A digital identity can be associated with (e.g., assigned) access rights. Access rights assigned to a digital identity can vary from one user to another. Access rights, as used herein, can include information describing a user's ability to access different areas of a facility. For example, a supervisory employee may be able to access more areas of a facility than a lower level employee.

In some embodiments, the access rights can be preconfigured access rights. For example, lower level employees can be given an access level that grants an employee access to lower security areas of a facility, whereas higher level employees can be given an access level that allows those higher level employees access to areas with higher security restrictions. As an additional example, access levels can be preconfigured based on the position the employee holds (e.g., a secretary can receive a different access level than a building technician).

In some embodiments, the access rights can be customized access rights. Customized access rights can include access rights that are customized for an individual user. For example, a user can receive access to areas A, B, C, and E, but not area D. As another example, a user can receive access to a number of areas of a building that do not fall within a preconfigured access level.

In some embodiments, a digital identity may expire after a particular period of time (e.g., one day). In some embodiments, a digital identity may expire based on a location of the mobile device. For example, a digital identity may expire when a user visiting the facility exits the facility. As the digital identity expires, so too can the access rights associated with it.

Some embodiments calling for enhanced security can verify that the mobile device to which the digital identity has been provided is indeed possessed by the correct user (e.g., the user allowed access). For example, the user can be authenticated to the mobile device. Such authentication can be carried out responsive to a prompt issued by the mobile device. In some embodiments, authenticating the user to the mobile device can include receiving one or more inputs made by the user. In some embodiments, input(s) can include PINs, codes, patterns, etc. In some embodiments, inputs can include one or more biometric inputs. A biometric input can include a fingerprint scan, a facial scan, etc., though it is to be understood that embodiments of the present disclosure are not limited to particular biometric input(s).

In some embodiments, determining whether the user of the mobile device (e.g., when the mobile device is in proximity to the area) is allowed access to the area can include determining whether a number of additional access rules apply. In some embodiments, a "two man rule" may apply wherein a user may not be allowed access unless that user is accompanied by another authorized user. That is, the presence of at least two authorized users within the particular distance of the area may be required in order to allow access.

In some embodiments, determining whether the user is allowed access to the area can include determining an occupancy status of the area. For example, certain areas may be limited with respect to a minimum or a maximum number of users allowed therein. In some embodiments, if a maximum allowed occupancy of an area has been reached, the user may be denied access. A notification regarding the reason for the denial may be provided via the mobile device.

In some embodiments, determining whether the user is allowed access to the area can include determining whether a particular user (e.g., an escort) is required to accompany the user into the area. For example, some areas may allow access by certain users (e.g., guests) only if those users are accompanied by another user (e.g., an employee).

At block 226, method 218 includes allowing access to the area via a relay associated with the area responsive to a determination that the user is allowed access based on the magnetic field information. If the user is determined to be allowed access to the area, and if the determined magnetic field information sufficiently correlates to the magnetic fingerprint, and if the RF signal from the beacon matches with the distance information, the mobile device and/or the access control system can transmit a signal (e.g., a control signal) to a relay associated with the area to allow access. In an example, the relay can be responsible for physically locking a door to the area and the signal causes the relay to change from a locked mode to an unlocked mode. Thus, the relay can grant the user access to the area of the facility responsive to a determination by the mobile device and/or the access control system that the user is allowed access.

Although not illustrated in FIG. 2, method 218 can include providing a number of notifications via the mobile device. A notification can be provided, for instance, responsive to access being granted to the user. In some embodiments, the mobile device can emit a particular audio notification (e.g., a beep) when access is granted. In some embodiments, the mobile device can vibrate when access is granted.

A notification can be provided, for instance, responsive to access being denied to the user. In some embodiments, the mobile device can emit a particular audio notification (e.g., a buzzer) when access is denied. In some embodiments, the mobile device can vibrate when access is denied. In some embodiments, the notification can include an audio and/or textual message including an explanation and/or reason for the denial of access.

The notification of the denial can include an option to contact a security operator (e.g., guard) and/or maintenance personnel. Thus, if equipment failure is responsible for the denial it can be addressed in a timely manner. In some embodiments, a notification can be sent to a security operator responsive to a repeated denial and/or a denial to a particular (e.g., highly-secure) area without the user's knowledge.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory computer-readable medium having instructions stored thereon executable by a processor to:
   receive location information associated with a mobile device in a facility;
   determine that the mobile device is within a geofence associated with an area of the facility based on the location information;
   responsive to determining that the mobile device is within the geofence, determine magnetic field information using a magnetic sensor of the mobile device, wherein the determined magnetic field information includes a determined level of a naturally-occurring magnetic field, and a determined direction of the naturally-occurring magnetic field; and
   allow access to the area via a relay associated with the area responsive to a determination that:
      the determined level of the naturally-occurring magnetic field matches a known level of a magnetic fingerprint within the geofence; and
      the determined direction of the naturally-occurring magnetic field matches a known direction of the magnetic fingerprint within the geofence.

2. The computer-readable medium of claim 1, wherein the instructions include instructions to determine the magnetic field information responsive to a communication being established between the mobile device and a beacon of the facility.

3. The computer-readable medium of claim 1, wherein the magnetic fingerprint of the facility includes a known level of a magnetic field at a particular location and a known direction of the magnetic field at the particular location.

4. The computer-readable medium of claim 3, wherein the instructions to allow access to the area include instructions to allow access responsive to a determination that a comparison between a level of the magnetic field included in the magnetic field information and the known level of the magnetic field of the magnetic fingerprint exceeds a particular threshold.

5. The computer-readable medium of claim 3, wherein the instructions to allow access to the area include instructions to allow access responsive to:
   a comparison between a level of the magnetic field included in the magnetic field information and the known level of the magnetic field of the magnetic fingerprint exceeding a particular threshold; and
   a comparison between a direction of the magnetic field included in the magnetic field information and the known direction of the magnetic field of the magnetic fingerprint exceeding a particular threshold.

6. A method for magnetic fingerprinting for proximity-based systems, comprising:
   receiving an indication that a mobile device is in communication with a beacon in a facility;
   responsive to receiving the indication that the mobile device is in communication with the beacon, determining magnetic field information associated with a particular geographic location of the mobile device using a magnetic sensor of the mobile device while the mobile device is in communication with the beacon, wherein the determined magnetic field information includes a determined level of a naturally-occurring magnetic field at the particular geographic location, and a determined direction of the naturally-occurring magnetic field at the particular geographic location;
   comparing the determined magnetic field information to a stored location-based magnetic fingerprint associated with the particular geographic location; and
   changing an operation of a proximity-based device responsive to a determination that:
      the determined level of the naturally-occurring magnetic field at the particular geographic location matches a known level of the location-based magnetic fingerprint at the particular geographic location; and
      the determined direction of the naturally-occurring magnetic field at the particular location matches a known direction of the location-based magnetic fingerprint at the particular geographic location.

7. The method of claim 6, wherein the proximity-based device is a relay of an access control system of the facility.

8. The method of claim 6, wherein each of the magnetic field information and the stored magnetic field information includes a respective level component and a respective direction component.

9. The method of claim 6, wherein the method includes:
   receiving another indication that the mobile device is in communication with another beacon in the facility while the mobile device is in communication with the beacon in the facility;

determining magnetic field information associated with another geographic location of the mobile device while the mobile device is in communication with the beacon and the other beacon;

comparing the determined magnetic field information to the stored magnetic field information associated with the other geographic location; and changing the operation of the proximity-based device responsive to the comparison exceeding a particular threshold.

10. A system for providing access control via a mobile device, comprising:

a beacon;

an access control system configured to determine an area of a facility to which a user is authorized access;

the mobile device configured to:
   establish a communication with the beacon at a particular location; and
   responsive to the establishment of the communication, determine magnetic field information associated with the location using a magnetic sensor of the mobile device, wherein the determined magnetic field information includes a determined level of a naturally-occurring magnetic field at the particular location, and a determined direction of the naturally-occurring magnetic field at the particular location;

a relay configured to grant the user access to the area of the facility responsive to:
   the establishment of the communication; and
   a determination that:
      the determined level of the naturally-occurring magnetic field at the location matches a known level of a magnetic fingerprint at the location; and
      the determined direction of the naturally-occurring magnetic field at the location matches a known direction of a magnetic fingerprint at the location.

11. The system of claim 10, wherein the access control system is remote with respect to the facility.

12. The system of claim 10, wherein the access control system is local with respect to the facility.

13. The system of claim 10, wherein the beacon is Bluetooth low energy beacon.

14. The system of claim 10, wherein the magnetic fingerprint associated with the location is determined by the mobile device before the magnetic field information associated with the location.

15. The system of claim 14, wherein the magnetic fingerprint is determined responsive to a first user input and wherein the magnetic field information is determined responsive to a second user input.

* * * * *